No. 658,845. Patented Oct. 2, 1900.
A. HENTSCHEL.
STREET SPRINKLING AND CLEANING CART.
(Application filed Mar. 8, 1900.)
(No Model.)
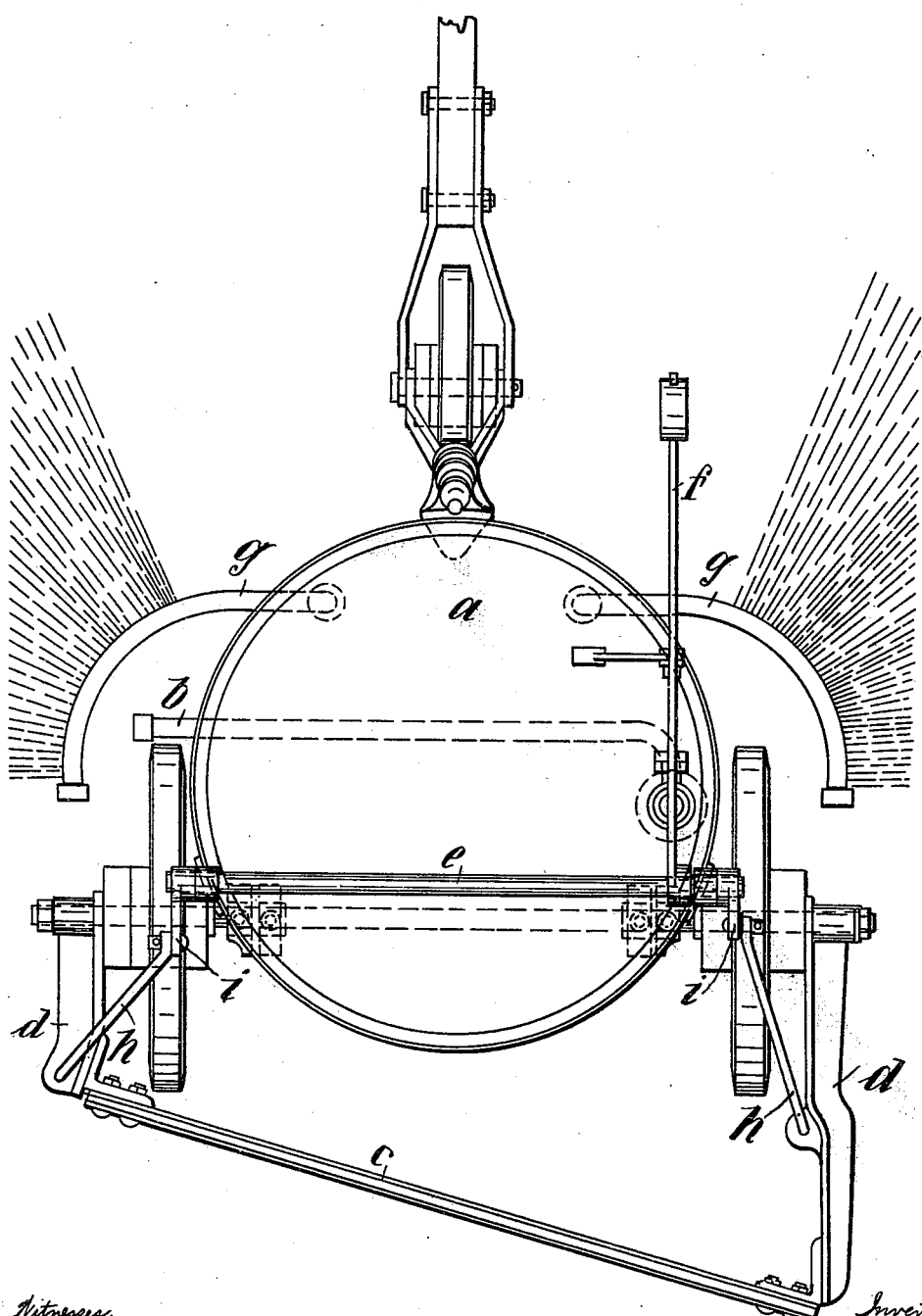

United States Patent Office.

AUGUSTIN HENTSCHEL, OF BERLIN, GERMANY.

STREET SPRINKLING AND CLEANING CART.

SPECIFICATION forming part of Letters Patent No. 658,845, dated October 2, 1900.

Application filed March 8, 1900. Serial No. 7,843. (No model.)

*To all whom it may concern:*

Be it known that I, AUGUSTIN HENTSCHEL, manufacturer, a subject of the King of Prussia, Emperor of Germany, and a resident of Berlin, Germany, have invented certain new and useful Improvements in Street Sprinkling and Cleaning Carts; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

My invention consists of a combination sprinkling and street cleaning cart differing from other carts and wagons of similar purpose in the particular combination of an obliquely-lying scraper with sprinkling-pipes arranged on each side of the cart.

In the accompanying drawing, forming an inseparable part of this specification, a plan view of a cart is illustrated embodying my invention.

The cart or wagon consists, essentially, of a water-reservoir $a$ with the usual sprinkling-pipe $b$ arranged therebelow. Secured to the rear of the cart in suitable arms $d$ is an obliquely-mounted scraper $c$. The arms $d$ are connected by rods $h$ to arms $i$ of a shaft $e$, which is provided with a weighted lever $f$. By bringing this lever in one or the other position the scraper may be raised or lowered.

Sprinkling-pipes $g$ are secured to each side of the cart and are so formed that the water thrown by them falls to the side of the cart upon the path then next adjoining that over which the cart is advancing. Each of these sprinkling-pipes is provided with a cock, (not shown,) so that either or both can be used as desired.

In operating it is obvious that as the cart advances in a certain path either of the side pipes $g$ can be utilized for sprinkling the path next adjacent, and as the latter lies beyond the reach of the scraper $c$ the water lies undisturbed and loosens the dirt upon the pavement. The cart having reached the end of its trip returns over the sprinkled path, resprinkling with the under pipe $b$, washing the loosened street dirt, so that the scraper $c$ shoves the same to the side and scrapes the pavement clean. On each return trip either of the pipes $g$ is, however, sprinkling a new strip, so that in each instance that path to be cleaned has had its dirt first loosened, thus insuring good results.

Having now described my invention, what I claim as new, and desire to protect by Letters Patent, is—

1. A street sprinkling and cleaning apparatus comprising a water-cart, a sprinkler extending across the path traveled over by said cart, and means in rear of said sprinkler for side-tracking the dirt on the sprinkled-over path, in combination with means for sprinkling a path on one or both sides of the cart for the purpose set forth.

2. In a new street sprinkling and cleaning cart the combination of sprinklers on each side of said cart and adapted to water the path then next adjoining that over which the said cart is advancing, a third sprinkler beneath said cart, and an oblique scraper on the rear of the said cart and directly behind said third sprinkler, substantially as described.

3. In a new street sprinkling and cleaning cart the combination of a reservoir, sprinklers in connection therewith and on each side thereof and adapted to water the path next adjoining that over which the said cart is advancing a third sprinkler in connection with said reservoir and beneath the same, and an obliquely-mounted adjustable scraper to the rear of said reservoir and behind said third sprinkler and adapted to shove the dirt loosened by the first sprinkling and flooded by said second aside, substantially as described.

In testimony that I claim the foregoing as my invention I have signed my name in presence of two subscribing witnesses.

AUGUSTIN HENTSCHEL.

Witnesses:
  GEORGE LOUBIER,
  MAX C. STÄHLER.